(12) United States Patent
Morard

(10) Patent No.: US 8,127,044 B2
(45) Date of Patent: Feb. 28, 2012

(54) METHOD FOR THE DELIVERY OF AUDIO AND VIDEO DATA SEQUENCES BY A SERVER

(75) Inventor: Jean-Pierre Morard, Neuilly sur Seine (FR)

(73) Assignee: Sagem Communications SAS, Paris (FR)

( * ) Notice: Subject to any disclaimer, the term of this patent is extended or adjusted under 35 U.S.C. 154(b) by 77 days.

(21) Appl. No.: 12/528,857

(22) PCT Filed: Feb. 26, 2008

(86) PCT No.: PCT/FR2008/050319
§ 371 (c)(1),
(2), (4) Date: Dec. 7, 2009

(87) PCT Pub. No.: WO2008/119902
PCT Pub. Date: Oct. 9, 2008

(65) Prior Publication Data
US 2010/0115136 A1    May 6, 2010

(30) Foreign Application Priority Data
Feb. 27, 2007   (FR) ...................................... 07 53538

(51) Int. Cl.
*G06F 15/16*    (2006.01)
(52) U.S. Cl. ...................................................... 709/247
(58) Field of Classification Search .......... 709/217–219, 709/231, 246–248; 382/232–253; 375/240, 375/240.01, 240.02, 240.24
See application file for complete search history.

(56) References Cited

U.S. PATENT DOCUMENTS

| | | | |
|---|---|---|---|
| 6,484,212 B1 | 11/2002 | Markowitz et al. | |
| 7,171,444 B2 * | 1/2007 | Deshpande | 709/203 |
| 7,844,848 B1 * | 11/2010 | Hobbs | 713/400 |
| 2003/0058248 A1 * | 3/2003 | Hochmuth et al. | 345/537 |
| 2004/0010622 A1 * | 1/2004 | O'Neill et al. | 709/247 |
| 2004/0151390 A1 * | 8/2004 | Iwamura | 382/236 |
| 2004/0189598 A1 * | 9/2004 | Fujita et al. | 345/156 |
| 2005/0104892 A1 * | 5/2005 | Covington et al. | 345/555 |
| 2005/0105608 A1 * | 5/2005 | Coleman et al. | 375/240.01 |
| 2006/0117359 A1 * | 6/2006 | Baldwin et al. | 725/90 |
| 2006/0282855 A1 * | 12/2006 | Margulis | 725/43 |
| 2006/0288392 A1 | 12/2006 | Fleming | |
| 2007/0124474 A1 * | 5/2007 | Margulis | 709/226 |

FOREIGN PATENT DOCUMENTS

EP   0 607 904 A2   7/1994
WO   WO-2004/104773 A2   12/2004

* cited by examiner

*Primary Examiner* — Douglas Blair
*Assistant Examiner* — Shirley Zhang
(74) *Attorney, Agent, or Firm* — Im IP Law PLLC; C. Andrew Im

(57) ABSTRACT

The invention relates to a method for the delivery of audio and video data by a server device. A network can interconnect various media components in the same home. Such a network comprises a server, generally a computer, and clients, for example a decoder. This configuration offers the possibility of creating a desktop managed by the server but remotely controlled by the client via the network. Such a network must transmit data and process them rapidly. Currently, the trend is to compress the data traveling through the network as much as possible. However, the more these data are compressed, the longer they take to process. The invention does not provide for facilitating the transfer of the data but for reducing the time required to process the data flowing through the network.

10 Claims, 2 Drawing Sheets

METHOD FOR THE DELIVERY OF AUDIO AND VIDEO DATA SEQUENCES BY A SERVER

RELATED APPLICATIONS

This application is a §371 application from PCT/FR2008/050319 filed Feb. 26, 2008 which claims priority from French Patent Application No. 07 53538 filed Feb. 27, 2007, each of which is herein incorporated by reference in its entirety.

TECHNICAL FIELD OF THE INVENTION

The present invention relates to a method for the delivery of audio and video data sequences by a server. The multiplicity of media, even in private homes, opens up many possibilities. The presence of a network offers the possibility to interconnect various media components in the same home. Such a network exists in the form of a server device or server, generally a computer, and client devices or clients, for example video decoders, connected to each other by a network, be it in HDMI, WIFI or Ethernet form, or even by carrier current.

Such a configuration makes it possible to create a desktop. Such a desktop includes a display on a screen, typically that of the client, of a menu that enables a user of the client to enter a command. This desktop is managed by the server but remotely controlled by the client via the network. This configuration also makes it possible to use a remote media center under these same conditions.

BACKGROUND OF THE INVENTION

A media center is a device comprising a control unit and an action unit for handling the command. Typically, the control unit can include a display of control buttons on a screen, for example that of the desktop. This control unit includes a device, for example a remote control, for activating the buttons displayed. The action unit of the media center handles the actions generated by activating the buttons displayed, for example turning up the sound or switching from one video sequence to another.

Such a desktop or media center can, for example, be displayed by the client on a living room television screen or another display means forming a user interface. A piece of user interface software makes it possible to display data. The user can interact with the data displayed using a control device such as a remote control, for example. Typically, the control unit of a media center as defined above is also part of the user interface.

The control of a media center by a user takes place at the client level. A user interface can be defined as a tree of commands available to the user. Thus, the user interacts with this user interface by giving execution orders, using a remote control for example, among the available choices displayed by the user interface. These orders are received by the client and result in the creation of user interactions by the client.

After the creation of a user interaction, the client sends a request message to the server in order to have said user interaction processed. It is the server that, by processing the request message sent by the client, processes the order from the user. Once this request message is processed, the server sends the client a response to this request message. The response from the server is produced by the processing of the user interaction and particularly by the encoding of video and audio data to be delivered by the client as a result of this user interaction. This response is received and decoded by the client, which displays the result of the operation on the user interface.

In such a system, the server encodes, i.e. compresses, what it is delivering prior to sending it to the client. If the server were to display the images it delivered on its own screen, it would not be necessary for it to compress them. The transfer units in the internal bus of the server machine support a high transfer rate. For a compression, the server typically performs a capture of its own display, encodes it and sends it via the network to the client, for example at the client's IP address in an Ethernet network. The encoding is therefore performed on a sequentially defined point by point image, in the so-called bitmap format. Such a sequentially defined point by point image is well suited to being displayed on a monitor.

The encoding done by the server is space-time encoding, which means that the compressed data include both audio/video data and signaling data for delivering these data correctly. Such an encoding can, for example, be done based on the H264 standard. Such compression encoding makes it possible to transmit data at high speed through a simplified connection, for example an HDMI connection. The H264 protocol makes it possible to encode video flows at a speed less than half that obtained with the MPEG2 standard for the same quality. The H264 standard uses a lossless compression mode. During the encoding, an image is divided into individual macroblocks. Each macroblock is encoded.

Upon reception, the client must decode the audio/video data sent by the server. The decoding of these data by the client is generally performed by a dedicated electronic circuit of a graphics/sound card in the client. Once the data have been decoded, the client delivers them via its delivery means on its own screen.

However, either the encoding of data by the server requires a lot of power, or the encoding by the server requires a processing time that makes real-time data encoding impossible. In practice, encoding requires five times as much power from the server as decoding requires in the client. The typical household servers are not capable of real-time encoding.

The current media centers contain a large number of animations. These animations include, for example, an animated button or icon, a wallpaper in recurring motion or even the scrolling of a scrolling menu. These animations are small video sequences. In order to transmit them to the client that is requesting them, the server must encode them and transmit them so they can be delivered via the user interface. Such video sequences are defined by a series of images delivered at sufficient speed to give the video good fluidity. A large number of these animations appear subsequent to user interactions. However, as a result of such user interactions, only part of what is displayed on the screen of the client is changed. In fact, for example for a menu that scrolls as a result of a user's click on a button of the menu displayed only the part in which the menu scrolls changes, the rest of the image remaining fixed.

Currently, audio/video protocols encode only entire images. Thus, the encoding is done on both the parts of the image that have changed as a result of the user interaction and the parts of the image that have not changed. This overall encoding substantially increases the encoding time of the audio/video data to be transferred.

In conclusive tests of the main display and remote control function, the time required for the display of the audio/video data by the client proved to be too long. This display time was on the order of several seconds for a single image. Thus, this display time does make it possible to use this function as is.

The overly long display time is explained by two factors: first, the transmission time through the IP connection and second, the processing time for the request messages. The object of the invention is to reduce both of these times. The encoding and decoding of audio/video data takes even longer when the data are compressed and therefore complex. Currently, in order to decode graphics with this type of application, the decoder must include a graphics library which makes it possible to decompress compressed audio/video data.

One solution known to the person skilled in the art for solving the problems tied to the transmission time of the data via a network consists of reducing the volume of the data traveling through the network. Thus, by compressing the data as much as possible in accordance with known compression standards, the audio/video data obtained are less voluminous. This compressed information therefore travels through the network faster. However, such a solution makes the compression of audio/video data even more complex. This complexity increases the encoding time in the server. This complexity also increases the time required for the client to decode the data received. Moreover, this solution is dependent on the inclusion of a library that corresponds to the compression format used in the client. This solution therefore has the advantage of reducing the transfer time of the data through the network, but considerably increases the processing time of the audio/video data by both the server and the client.

By combining the TightVNC application with the H264 protocol for a screen capture, for example, the problem of completely encoding entire images can be solved. Thus, all of the functions for detecting movement, calculating images, etc., are calculated by the H264 library. An image of the entire screen in the video that comprises only the changes is then sent, this image having a high compression rate. Moreover, the encoding time of an image does not vary much.

However, with such a method, it is necessary to completely replicate the architecture of the TightVNC server code. Moreover, the duration of the encoding by the server runs the risk of being relatively long. With a server having a 2.8 GHz dual-core processor, the encoding, with the options at a minimum, lasts more than a tenth of a second per image at a resolution of 352×288 with a bit rate at 30.0 Hz of 150 kilobytes per second. Such a method would therefore take approximately one second to encode an image having a resolution of 1280×720.

Thus, none of these solutions seems to effectively solve the problem of handling the transfer of audio/video data at an acceptable speed in a network.

OBJECT AND SUMMARY OF THE INVENTION

To solve this problem, the invention provides for reducing the server's encoding load in several ways. In addition, the invention provides for retaining a high level of compression of the data. In a media center or a menu display, the user interactions are often repetitive. There is therefore a good chance that the animations generated by these user interactions will occur several times during a single use of a media center or a menu. In order to substantially reduce the server's encoding task, the invention provides for using the server's memory to store the audio/video sequences that have already been encoded previously. More particularly, the invention provides a step during which the server searches to see if the request message sent by the client has already been processed previously. If the message sent by the client has never been processed before, the server sends the client a rapid response and simultaneously processes the request message completely. Once the request message is completely processed, the result of this processing is stored in memory by the server. This processing can be subsequently reused if the client sends the same request message again. If the message has already been processed by the server previously, the server sends the client the result of the processing of this request message stored in its memory.

The invention also provides for reducing the server's encoding load by performing the encoding only on the audio/video data that have changed as a result of a user action. To do this, the invention calculates the fixed parts of the image and encodes only the data representing animations or video sequences that correspond to user interactions.

Furthermore, the invention processes the data at the level of the raw images, as displayed. Thus, the invention is not dependent on a specific type of compression. The invention can therefore save time at the encoding level no matter what type of encoding is chosen for compressing the audio/video data.

Thus, the subject of the invention is a method for the delivery of audio and video data sequences by a server delivering audio and video data sequences, wherein the audio/video data sequences, being defined sequentially point by point, flow via a network between the server and a client, the audio/video data sequences received by the client are delivered by the client interactively, a user of the client gives an order for a delivery of a sequence via a user interface of the client, this order generating the production and transmission of at least one request message by the client to the server, and the request message transmitted to the server by the client is processed by the server in the form of an image encoding in a compressed format, characterized in that the processing of the request message by the server includes at least the following steps a step during which the server searches in a memory to see if the processing of this request has already occurred and if any compressed data of this data sequence are available to be delivered to the client;

if the processing of this message has not already occurred previously:

the server sends a rapid response message to the client; this rapid response message comprises an audio/video sequence comprising the first and last image of the compressed data sequence;

the server processes this request completely and stores the result of the complete processing of this request in memory, thus becoming capable of delivering the response later;

if the processing of this request has been done previously, the server immediately sends the data of the sequence contained in the memory of the client.

BRIEF DESCRIPTION OF THE DRAWINGS

The invention will be more clearly understood by reading the following description and examining the accompanying figures. These are given only as an example and do not in any way limit the invention. The figures show.

DETAILED DESCRIPTION OF THE EMBODIMENTS

Figure 1:
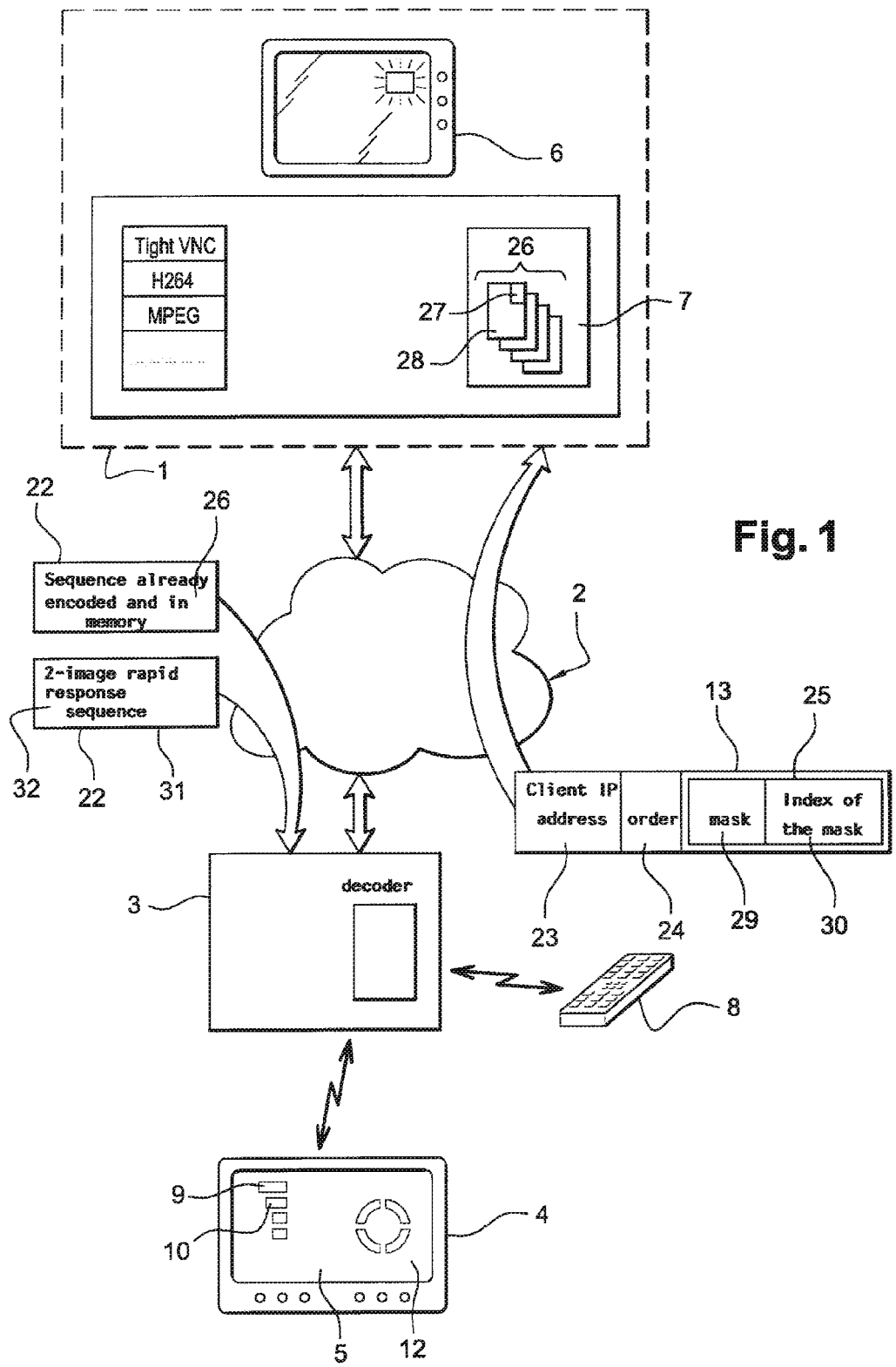
FIG. 1: An installation of a network device according to the invention.

FIG. 1 represents an installation of a network device according to the invention. Such an installation comprises a server 1 connected via a network 2 to a client 3. The network 2 makes it possible to transmit audio/video data between the server 1, for example a computer 1, and the client 3, for example a decoder. A delivery means 4 of a user interface 5 is connected to the client 3. One such delivery means 4 can be, for example, a living room television set 4. The server 1 includes its own delivery means 6, for example a computer monitor 6. In addition, the server 1 includes its own memory 7. The server 1 can include an encoding protocol such as the H264 protocol, and an application such as VNC server. The user can interact with the user interface 5 by means of, for example, a remote control 8. These interactions 11 are received by the client 3, which transmits the order generated by these user interactions 11 to the server 1. The server 1 processes the order generated by these user interactions 11 and sends the client 3 the audio/video data corresponding to the execution of the order given as a result of these user interactions 11.

The audio/video data received by the client 3 are retrieved by the client 3 in an event-based way. This means that the client 3 allows the user to interact with the data. Typically, a user interface 5 allows the user to navigate through a tree of possible interactions 11. For example, the user interface 5 can be displayed in the form of a menu 9 through which the user navigates by activating buttons 10 in the menu 9 using a remote control 8. The activation of such buttons 10 can be displayed in the form of a short animation corresponding to a video sequence. These animations may appear, for example, when a button 10 is activated, when a button 10 is passed over, or even in an animated wallpaper. Such animations are video sequences displayed as a result of user interactions 11. However, these animations generally change only a small part of the image 12 displayed by the user interface 5, the rest of the image remaining unchanged.

Figure 2:
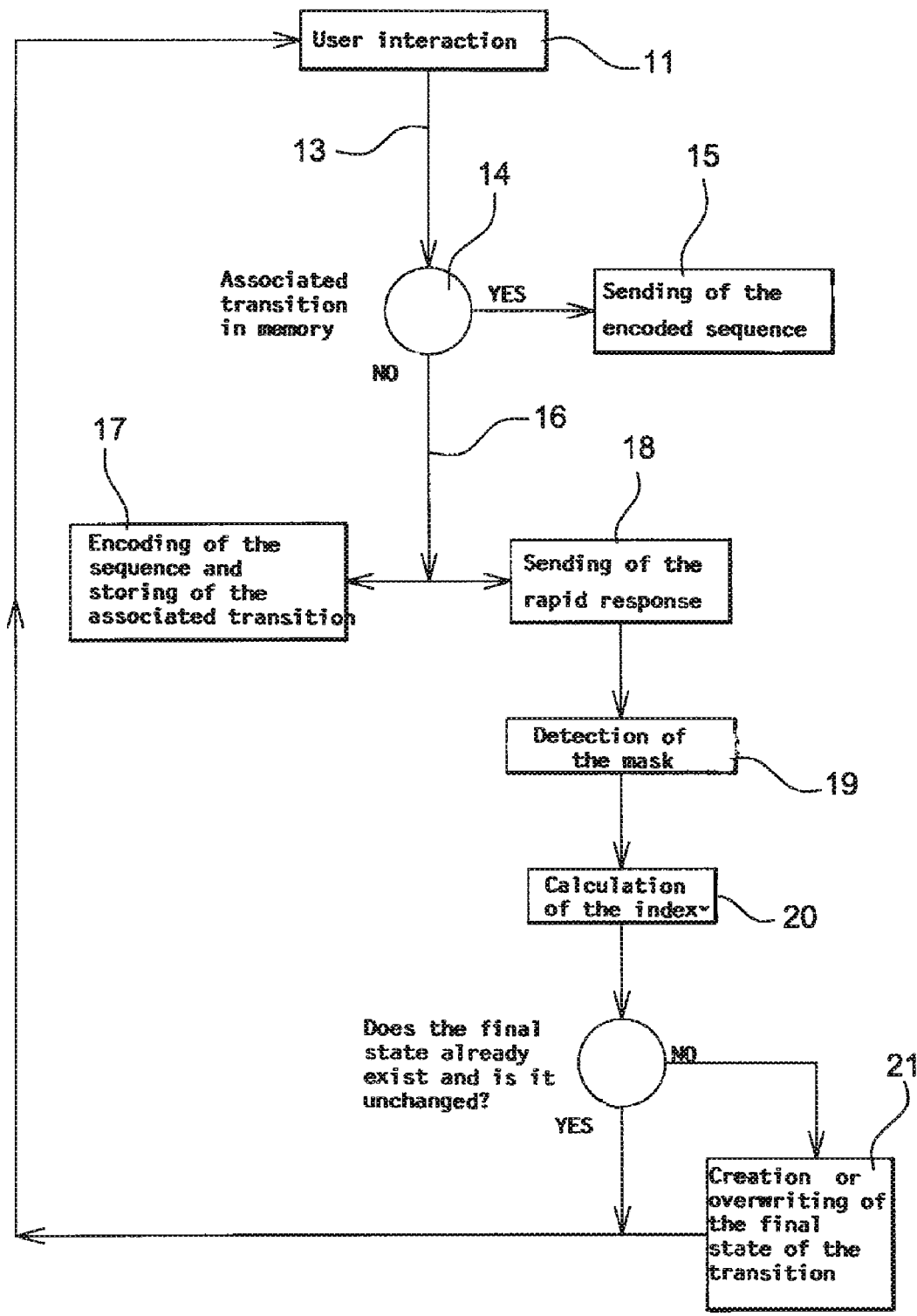
FIG. 2: A diagram of an implementation of the method according to the invention.

FIG. 2 represents a diagram of an implementation of the method according to the invention. The user interactions 11 generate the creation of a request message 13 at the level of the client 3. As soon as the request message has been created by the client 3, the client 3 sends this request message to the server 1. These request messages 13 flow via the network 2 between the client 3 and the server 1. In the prior art, the server 1 analyzes the request from the client 3 and encodes the response 22 prior to sending this response 22 to the client 3. The client 3 then decodes the response 22 received prior to delivering the changes generated by this request message via the user interface 5.

The request messages 13 sent by the client 3 include various pieces of information. This information enables the server 1 to process the data contained in this message 13 and to send a response message 22 to the client 3. This response message 22 enables a delivery, by said client 3 via the user interface 5, of the audio/video data corresponding to the interaction 11 generated by the user. A request message 13 therefore includes the address 23 to which the server 1 must respond, typically the IP address 23 of the client 3, an order 24 to be executed as a result of a user interaction 11, and a state 25 corresponding to the current display delivered by the client 3 via the user interface 5. This current state 25 enables the server 1 to process the order 24 given as a function of the current display of the user interface 5, i.e. to encode the audio/video data sequence to be displayed via the user interface 5 by the client 3 from the current display as a result of said user interaction 11.

According to the invention, when a user interaction 11 results in an animation, the server 1 encodes the animation and the mask separately. What we call the mask is the background of the image, which remains fixed during the animation. By combining, for example, the TightVNC application with the H264 protocol at the level of the send function, the server 1 sends only the parts that have changed as a result of a user interaction 11 and the position in which this sequence should be placed. This separation of the encoding makes it possible to not have to encode the entire image to be displayed during an animation. Thus, the server 1 encodes only the animation without re-encoding, for each image in a display comprising an animation, the entire image in each display.

In addition, the invention provides for the server 1 to store in memory 7 the compressed data sequences 26 of the encoded audio/video sequence corresponding to said animation. If the user interaction 11 that generated this animation from the same mask were to be subsequently repeated, the server 1 would not re-encode the animation, but would immediately send the corresponding data sequence 26 already encoded and already stored in memory 7. Such a use of the memory 7 makes it possible to reduce the workload of the server 1 no matter what type of encoding is chosen.

However, it is necessary, in order to retrieve the encoded data sequence 26 corresponding to a mask and to a given user interaction 11, to be able to search for the correct data sequence 26. This requires a system for indexing the compressed data sequences 26. According to the invention, this indexing 27 is done on the first image 28 of an audio/video sequence 26. Such an indexing 27 performed on a single image 28 is not dependent on a given type of compression and can therefore be applied with any type of audio/video encoding.

In order to perform these steps, a request message 13 includes the order 24 corresponding to the user interaction 11, the mask 29, an index 30 of the mask and the information 23 related to the network 2. The processing of the request messages 13 includes a search phase, and if necessary, an audio/video data encoding phase. This encoding can be done, for example, based on the H264 standard. The encoded audio/video data sequences 26 are the images normally displayed by the server 1, which means that these images are screen captures of the server 1. These images are therefore defined sequentially, point by point.

A state 25 is defined as comprising a mask 29 and an index 30 of the mask. According to the invention, the states 25 can be accessed directly via the indexes 30 in order to quickly learn, for a given indexed image, whether or not it corresponds to a state 25 that is already known. If the state 25 is already known, the server 1 searches to see if there is an existing transition from the mask 29 corresponding to this state 25. A mask 29 is a cutout of the image that includes only the fixed parts of the image. Typically, a mask 29 is comprised of the displayed image minus the animated parts such as the animated menus or animated buttons in the displayed image.

A transition includes the user interactions 11 and the video sequences 26 corresponding to this user interaction. Thus, subsequent to a user interaction 11 resulting in a change from a state one to a state two, a transition comprising an audio/video sequence for changing from state one to state two is passed through. The transitions are indexed to the first image 28 of the audio/video data sequence 26 they comprise. This indexing 27 makes it possible to access this sequence 26 immediately if the user interaction 11 and the mask 29 corresponding to the initial state 25 have already occurred, the masks 29 and the transitions being complementary so as to form a complete image.

During the initial startup, the server 1 performs several steps. During a first step, the server 1 encodes the entire starting sequence to be displayed and immediately sends this starting sequence to the client 3. During a second step, the server 1 determines the first mask and the first index corresponding to the starting state. Finally, during a third step, the server 1 associates the state having this index with the corresponding mask. Later, during a change of state resulting from a user action 11, the request message 13 will contain the index of the state associated with the current display of the user interface 5. To do this, the server 1 stores, for example in its cache memory, both the state and its index.

After the startup of the system, the invention includes several steps. The server 1 has already stored in memory 7 one or more states 25 that have already occurred. When a user interaction 11 generates a change of state 25, the client 3 sends a request message 13 as described above to the server 1. The server 1 then immediately processes this request message 13. In a first phase 14, the server 1 searches in its memory 7 for an existing transition, indexed by the user interaction 11, from the indexed state 25 sent by the client 3 in its request message 13.

In the case 15 where such an indexed transition exists in memory 7, the server 1 immediately sends the corresponding audio/video data sequence 26 already encoded. The lack of a need to encode anything saves the server 1 a substantial amount of time. Since the server 1 does not have to encode the audio/video data sequence 26, the server 1 remains available to perform other tasks.

In the case 16 where there is no existing indexed transition in memory 7, the server 1 encodes 17 the audio/video sequence. The server 1 then indexes this audio/video sequence and associates it with a transition. However, in order not to inhibit the user while the server 1 performs the encoding 17, the server 1 performs an additional task 18 simultaneous with the encoding 17. This additional task 18 consists of sending the client 3 a rapid response message 31. In order to save the server 1 time without inhibiting the user, the server 1 sends in response to the client 3 an audio/video sequence 32 comprising only two images. The two images of this audio/video sequence 32 are the first and last image of the complete audio/video data sequence 26. The last image of an audio/video data sequence is the one that is normally displayed immediately at the level of the server 1. This last image is therefore immediately accessible for the sending of the rapid response 31. Once the encoding 17 of the complete audio/video data sequence 26 is finished, the server 1 stores in memory 7 the transition corresponding to this audio/video data sequence 26 and this user interaction 11.

The sending of this rapid response 31 does not make it possible to deliver the audio/video data sequence 26 corresponding to the user interaction 11 at the first occurrence of said user interaction 11. This rapid response 31 only makes it possible to display the first and last image of said audio/video data sequence. However, this rapid response 31 from the server 1 keeps the user from remaining inhibited while the server 1 performs the encoding 17 of said complete sequence 26.

Once the sequence, or the rapid response 31 sent by the server 1 depending on the circumstances, is sent to the client 3, the server 1 calculates the mask 19 and the index 20 of the final image obtained. These elements make it possible to create the new state corresponding to this final image. In the case where there is no existing indexed transition corresponding to the user interaction 11 from the first state 25, this transition is indexed by its first image 28 and is placed in memory 7. In the case where a transition indexed by the same user interaction 11 from the first state 25 already exists and where the final state obtained by the user interaction 11 is different from the one in memory 7 obtained by this indexed transition, the transition already in memory 7 is replaced 21 by the new encoded transition.

Typically, the mask and the changes are calculated each time. With each user interaction 11, the difference between the displayed image and the last image of the film stored in memory 7 is calculated. If these images are different, the transition is re-encoded during the display of the previous transition. Subsequently, the correct image, i.e. the current image, is displayed after the delivery of the previous audio/video sequence. A user interaction 11 can generate only one indexed video sequence 26 for a given initial image of the audio/video sequence and a given user interaction 11.

Such a method has the advantage of reducing execution time with any media center, given that the method does not use any particular type of encoding. This method for the delivery of audio and video sequences by a server 1 is particularly well adapted to user interfaces 5 like the menus found on DVDs or other menus having animations involving precise changes whereby users can only move from one button 10 to another with predefined cursor movements.

The invention claimed is:

1. A method for delivering audio/video data sequences by a processor-based server, comprising the steps of:
   receiving an order for a delivery of an audio/video data sequence from a user of a client device via a user interface of said client device;
   generating and transmitting at least one request message by said client device to said processor-based server via a network after said order is received from the user of said client device; and
   processing said at least one request message by said processor-based server in the form of an image encoding in a compressed format comprises at least the following steps of:
     searching in a memory by said processor-based server to determine if said at least one request has been processed already and if any compressed data of the audio/video data sequence ordered by the user of said client device are available for delivery to said client device;
     transmitting a rapid response message to said client device by processor-based server via said network, processing said at least one request message completely, and storing compressed data of the audio/video data sequence ordered by the user of said client device in the memory if it is determined that said at least one request message has not been processed by said processor-based server, wherein said rapid response message comprises an audio/video data sequence comprising a first image and a last image of the compressed data of the audio/video data sequence ordered by the user of said client device, wherein the step of transmitting said rapid response message and processing said at least one request message completely are performed simultaneously; and
     transmitting to said client device via said network the compressed data of the audio/video data sequence ordered by the user of said client device in the memory by said processor-based server if it is determined that said at least one request message has been processed previously by said processor-based server.

2. The method of claim 1, further comprising the step of encoding audio/video data based on H264 standard by said processor-based server.

3. The method of claim 1, wherein the step of processing said at least one request message by said processor-based server comprises the step of indexing encoded images of the compressed data of the audio/video data sequence stored in the memory.

4. The method of claim 3, wherein the step of processing said at least one request message by said processor-based server comprises the step of searching indexes of said encoded images of the compressed data of the audio/video data sequence stored in the memory.

5. The method of claim 1, further comprising the step of encoding only changed areas of images of the compressed data of the audio/video data sequence by said processor-based server.

6. The method of claim 1, wherein the step of processing said at least one request message by said processor-based server comprises the steps of:
   generating a mask representing a fixed part of an image;
   indexing said mask;
   generating a transition representing an animated part of the image; and
   indexing said transition; and
   wherein indexes are sent to said processor-based server in said at least one request message by said client device via said network.

7. The method of claim 1, wherein an user interaction generates transmission of the audio/video sequence, said user interaction being performed by the user of said client device on an initial image displayed on said client device; and further comprising the step of parameterizing the audio/video data sequence by a state of an audio/video database of said processor-based server or by said at least one request message.

8. The method of claim 7, wherein the step of processing said at least one request message by said processor-based server comprises the step of replacing any previous audio/video data sequence corresponding to said user interaction with a new audio/video data sequence corresponding to a new state of said audio/video database of said processor-based server when the state of said audio/video database of said processor-based server changes.

9. The method of claim 1, further comprising the step of sequentially defining the audio/video data sequences point by point, which flow via said network between said processor-based server and said client device.

10. The method of claim 1, further comprising the steps of:
   receiving by said client device via said network the audio/video data sequences interactively delivered to said client device.

* * * * *